(12) United States Patent
Dianda

(10) Patent No.: US 7,394,820 B1
(45) Date of Patent: Jul. 1, 2008

(54) INTERWORKING UNIT (IWU) FOR INTERFACING A PLURALITY OF CLIENT DEVICES TO A MULTIPROTOCOL LABEL SWITCHING (MPLS)

(75) Inventor: Robert B. Dianda, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 835 days.

(21) Appl. No.: 10/766,265

(22) Filed: Jan. 28, 2004

(51) Int. Cl.
*H04L 12/56* (2006.01)
(52) U.S. Cl. ..................................... 370/401
(58) Field of Classification Search ............... 370/351, 370/389, 392, 400, 401
See application file for complete search history.

(56) References Cited

U.S. PATENT DOCUMENTS

| | | | |
|---|---|---|---|
| 6,477,166 B1 | 11/2002 | Sanzi et al. | 370/395.1 |
| 7,136,374 B1* | 11/2006 | Kompella | 370/352 |
| 2003/0012189 A1 | 1/2003 | Nomura et al. | 370/389 |
| 2004/0174879 A1* | 9/2004 | Basso et al. | 370/392 |
| 2004/0223499 A1* | 11/2004 | Sanderson et al. | 370/395.52 |
| 2006/0104297 A1* | 5/2006 | Buyukkoc et al. | 370/409 |

OTHER PUBLICATIONS

The ATM Forum Technial Committee. ATM-MPLS Network Interworking Version 1.0, AF-AIC-0178.000, Aug. 2001 [online] [retrieved on Jan. 6, 2004]. Retrieved from the Internet: <URL: http://www.atmforum.com/pub/approved-specs/af-aic-0178.000.pdf>.
IETF The Internet Engineering Task Force, MPLS Label Stack Encoding, Copyright The Internet Society (2001) [online] [retrieved Jan. 6, 2004]. Retrieved from the Internet: <URL: http://www.ietf.org/rfc/rfc3032.txt?number=3032>.

* cited by examiner

*Primary Examiner*—Hassan Kizou
*Assistant Examiner*—Betty Lee

(57) ABSTRACT

An InterWorking Unit (IWU) for interfacing a plurality of client devices to a MultiProtocol Label Switching (MPLS) network is provided. The IWU includes a plurality of IWU edge nodes and an IWU switch node communicating with the plurality of IWU edge nodes. The IWU switch node is configured to receive a MPLS frame from the MPLS network, with the MPLS frame including an inner label and an outer MPLS label, process the outer MPLS label in order to determine one designated IWU edge node of the plurality of IWU edge nodes, with the one designated IWU edge node being designated by the outer MPLS label, and transfer the MPLS frame to the one designated IWU edge node. The one designated IWU edge node is configured to transfer the data transported in the MPLS frame to a designated client device that is designated by the inner label of the MPLS frame.

18 Claims, 4 Drawing Sheets

INTERWORKING UNIT (IWU) FOR INTERFACING A PLURALITY OF CLIENT DEVICES TO A MULTIPROTOCOL LABEL SWITCHING (MPLS)

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to communication networks, and more specifically to an InterWorking Unit (IWU) for interfacing a plurality of client devices to a MultiProtocol Label Switching (MPLS) network.

2. Description of the Prior Art

Communication networks are widely used for communicating and transferring a wide range of digital information. One aspect in common between communication networks is that improvements are constantly being sought. New communications networks are constantly being developed. In addition, refinements to existing networks are constantly being pursued.

One new development in communication networks is a MultiProtocol Label Switching (MPLS) network, wherein a MPLS network is employed to pass data between elements or devices of an existing network. For example, a MPLS network can be an intermediate component of an Asynchronous Transfer Mode (ATM) network. It should be understood that the MPLS network can be an intermediate component of any type of packet based network. In addition, the MPLS network can be used as a converged network infrastructure that aggregates and transports packet and circuit protocol traffic (e.g., Frame Relay, ATM, IP, SONET, etc.) in a collective manner over a single, cohesively managed network. This application is sometimes called "Layer 2 MPLS" or "Layer 2 Transport over MPLS." A converged network advantageously eliminates the need for multiple overlay networks.

InterWorking Units (IWUs) are used at the edge of the MPLS network to interwork between MPLS and the other communication network protocols. The MPLS network provides Label Switch Paths (LSPs) between these IWUs by generating an outer MPLS label and incorporating the outer MPLS label and the incoming data cells or packets in an MPLS frame. These LSPs are unidirectional and are sometimes called transport LSPs. In addition, the IWUs can use the MPLS label stacking capability to multiplex LSPs within the transport LSPs by generating inner labels for a MPLS frame. These inner labels are assigned by the IWUs and are sometimes called interworking labels.

Because a LSP is unidirectional, two LSPs are needed for bi-directional communication between LSPs. The following description deals with one direction of a particular MPLS connection. In a unidirectional LSP, one IWU performs a transmit function and another IWU performs a receive function. For example, for an ATM connection, the transmit IWU would map an ATM Virtual Path Identifier/Virtual Channel Identifier (VPI/VCI) to an interworking LSP, and the receive IWU would map the interworking LSP to an ATM VPI/VCI. This usage of MPLS to transport other protocols is sometimes referred to as pseudowire emulation. The Internet Engineering Task Force (IETF) has defined pseudowire emulation in draft documents, including how to perform pseudowire emulation for a number of protocols, including ATM, Frame Relay, SONET, IP, etc.

FIG. 1 shows a prior art MPLS network 100. The prior art MPLS network 100 includes at least one edge node 110, at least one switch node 112, and a prior art InterWorking Unit (IWU) 120. Multiple edge and switch nodes will usually be included in the MPLS network 100, but a limited number are shown for clarity. The prior art IWU 120 includes a plurality of edge nodes. The prior art IWU 120 interfaces between the MPLS network 100 and a plurality of client devices, such as client devices X and Y, shown in the figure. The prior art IWU 120 translates MPLS frames between the MPLS network 100 and the client devices, including performing any necessary protocol translations. The client devices can comprise a destination network 102 or components of the destination network 102. A source network 101 can be in communication with the MPLS network 100 and can communicate with the destination network 102 through the MPLS network 100. In this prior art MPLS network configuration, each client device, such as clients X and Y, communicates through a designated edge node, such as through edge nodes A and B. The edge nodes A and B are components of the prior art IWU 120.

The basic concept of the MPLS network 100 is to switch data at the core of the MPLS network 100 and to route data at the edge. The edge nodes 110 perform the interworking between the MPLS network core and the other communication networks and protocols. This includes performing the appropriate pseudowire emulation procedure, establishing the transport LSPs to other edge nodes, establishing interworking LSPs within these transport LSPs, and selecting/routing the correct interworking LSP and transport LSP for the data unit to be transported. Therefore, edge nodes 110 are used at the ingress and egress edges of the MPLS network 100, where their high level of intelligence is used for routing and where their relative slowness can be tolerated. The switch nodes 112 are used in the core of the MPLS network 100. The switch nodes 112 perform routing on the transport LSPs and do not act on the interworking LSPs. The inherent speed of the switch nodes 112 offers a great advantage in transferring the MPLS frames from edge to edge of the MPLS network 100 at a very high speed.

In operation, a data stream enters the edge of the MPLS network 100 and the ingress edge node 110 performs the appropriate pseudowire emulation, which includes the addition of the interworking LSP and transport LSP headers. The outer MPLS label of the transport LSP operates to route the MPLS frame through the MPLS network. The ingress edge node 110 transfers the MPLS frame to a first switch node 112 of the determined route. All switch nodes 112 encountered by the MPLS frame examine the outer MPLS label and the transfer is performed by the switch nodes 112 based on the outer MPLS label. When the data leaves the MPLS network, routing and transfer is resumed using the inner label.

The LSP can be determined according to the nature of the MPLS frames to be transferred. In addition, the LSP can be determined according to a requested Quality of Service (QoS). Furthermore, the MPLS network 100 can improve the data exchange through path selection metrics including the destination, available bandwidth, congestion, and error performance.

A problem exists with authentication in the prior art MPLS network 100. In the prior art MPLS network 100 shown in FIG. 1, if source B spoofs a MPLS frame 107a, including a client device address (X), the MPLS frame 107a is not authenticated by the MPLS network 100 before the MPLS frame 107 is transferred out of the MPLS network 100. As a result, due to the lack of authentication of incoming data streams, source B can address a data stream to a destination client device even though source B is not permitted to send to the destination client device.

The MPLS frame address information can be erroneous, such as if the source network 101 (or source computer) has a configuration error. Alternatively, the MPLS frame address information can be a malicious entry, such as when a person is trying to use an existing but improper address. For example, the person could be attempting to send a virus (V). The end result is that when MPLS frames are accepted from untrustworthy sources, the MPLS frames are not authenticated and can be routed in an illegitimate manner.

The authentication problem exists at least partially because of the configuration of the prior art IWU 120. In the prior art IWU 120, the outer MPLS label of a MPLS frame may be stripped off outside the prior art IWU 120, by the immediately previous switch node. Even if the outer MPLS label were delivered to the prior art IWU 120, the prior art IWU 120 would strip off and ignore the outer MPLS label. Consequently, the MPLS frame must be routed to an edge node of the prior art IWU 120 based solely on the inner label. This scheme relies on all of the incoming MPLS frames to be properly labeled, and therefore relies on a properly labeled MPLS frame to be delivered by a proper edge node. However, for an improper inner label, the MPLS frame will nonetheless be delivered to an inner label destination by one of the plurality of edge nodes, even though the inner label is improper. By routing solely on the inner label to an edge node of the prior art IWU, the prior art enables a MPLS frame to be improperly delivered.

SUMMARY OF THE INVENTION

The invention helps solve the above problems. Advantageously, the invention enables authentication of a MPLS frame being transferred through a MultiProtocol Label Switching (MPLS) network. The invention provides an InterWorking Unit (IWU) and method wherein both an inner label and an outer MPLS label are available in the IWU and wherein the IWU can transfer the MPLS frame out of the MPLS network based on both the inner label and the outer MPLS label. In addition, according to the invention, a particular MPLS frame is routed to an edge node of the IWU based on the outer label, in contrast to the prior art.

An IWU for interfacing a plurality of client devices to a MPLS network is provided according to an embodiment of the invention. The IWU comprises a plurality of IWU edge nodes adapted for exchanging MPLS frames with the plurality of client devices. The IWU further comprises an IWU switch node communicating with the plurality of IWU edge nodes and adapted for exchanging the MPLS frames with the MPLS network. The IWU switch node is configured to receive a MPLS frame from the MPLS network, with the MPLS frame including an inner label and an outer MPLS label, process the outer MPLS label in order to determine one designated IWU edge node of the plurality of IWU edge nodes, with the one designated IWU edge node being designated by the outer MPLS label, and transfer the MPLS frame to the one designated IWU edge node. The one designated IWU edge node is configured to transfer the data transported in the MPLS frame to a designated client device that is designated by the inner label of the MPLS frame.

A method of operating an IWU for interfacing a plurality of client devices to a MPLS network is provided according to an embodiment of the invention. The method comprises an IWU switch node of the IWU receiving a MPLS frame from the MPLS network, with the MPLS frame including an inner label and an outer MPLS label. The method further comprises the IWU switch node processing the outer MPLS label in order to determine one designated IWU edge node of a plurality of IWU edge nodes. The one designated IWU edge node is designated by the outer MPLS label. The method further comprises the IWU switch node transferring the MPLS frame to the one designated IWU edge node. The method further comprises the one designated IWU edge node transferring the data transported in the MPLS frame to a designated client device that is designated by the inner label of the MPLS frame.

A software product for an IWU for interfacing a plurality of client devices to a MPLS network is provided according to an embodiment of the invention. The IWU comprises an IWU switch node adapted for exchanging MPLS frames with the MPLS network and a plurality of IWU edge nodes in communication with the IWU switch node and adapted for exchanging the MPLS frames with the plurality of client devices. The software product comprises a control software configured to direct the IWU switch node to receive a MPLS frame from the MPLS network, with the MPLS frame including an inner label and an outer MPLS label, to direct the IWU switch node to process the outer MPLS label in order to determine one designated IWU edge node of the plurality of IWU edge nodes, with the one designated IWU edge node being designated by the outer MPLS label, to direct the IWU switch node to transfer the MPLS frame to the one designated IWU edge node. The control software is further configured to direct the one designated IWU edge node to transfer the data transported in the MPLS frame to a designated client device that is designated by the inner label of the MPLS frame. The software product further comprises a storage system that stores the control software.

BRIEF DESCRIPTION OF THE DRAWINGS

The same reference number represents the same element on all drawings.

DETAILED DESCRIPTION OF THE PREFERRED EMBODIMENT

Figure 1:
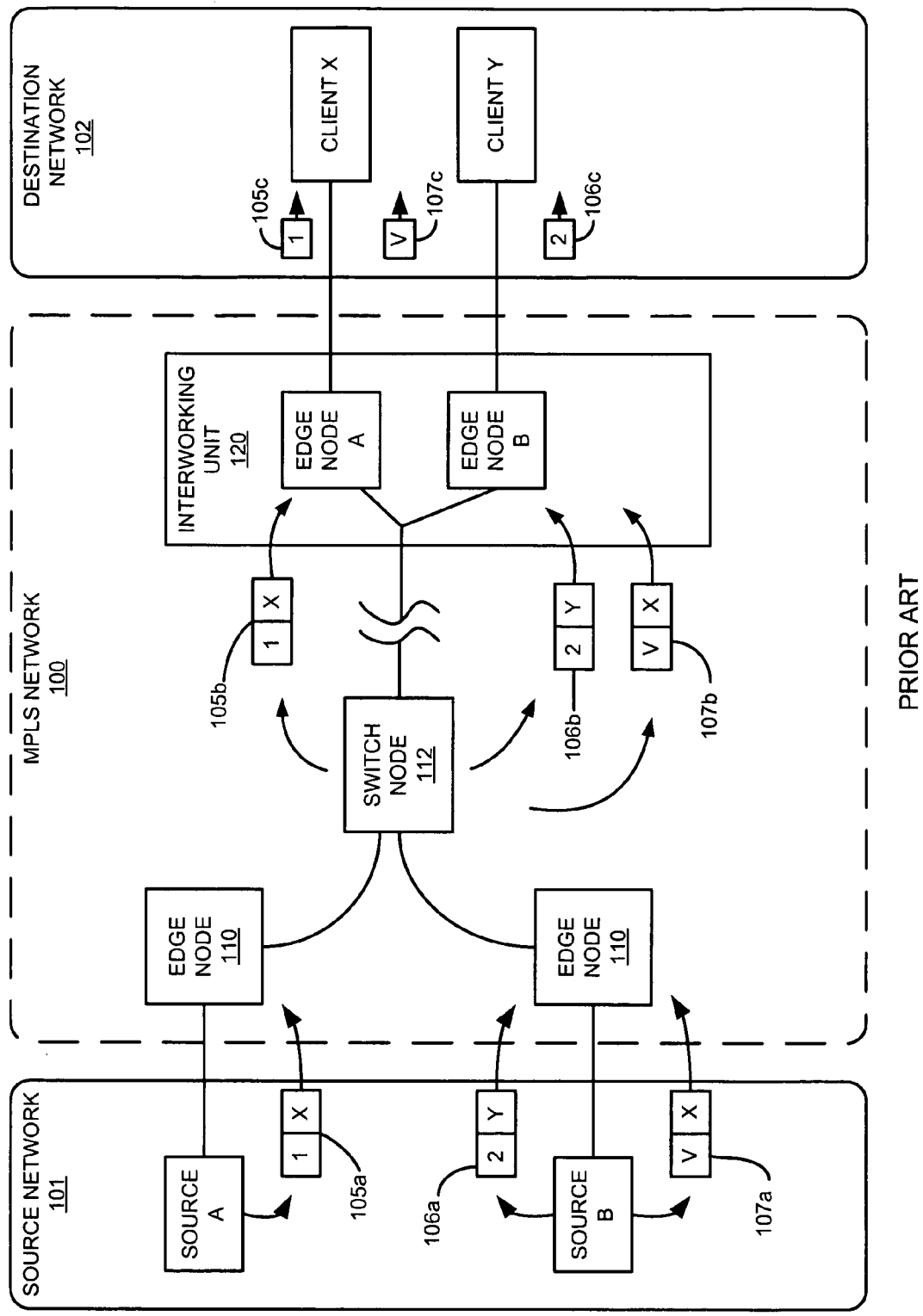
FIG. 1 shows a prior art MPLS network.
Figure 2:
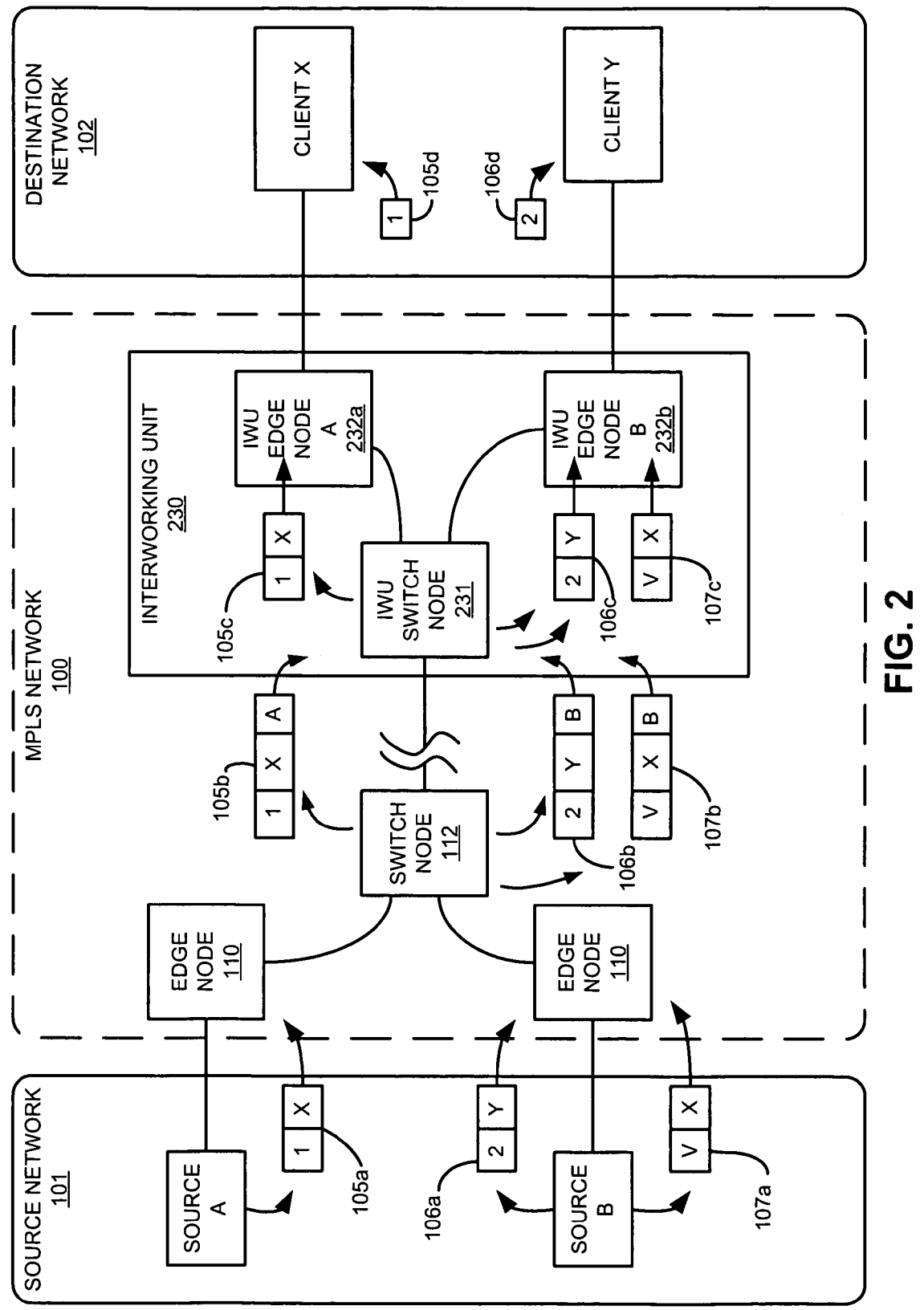
FIG. 2 is a diagram of an InterWorking Unit (IWU) for interfacing a plurality of client devices to a MultiProtocol Label Switching (MPLS) network according to an embodiment of the invention.
Figure 3:
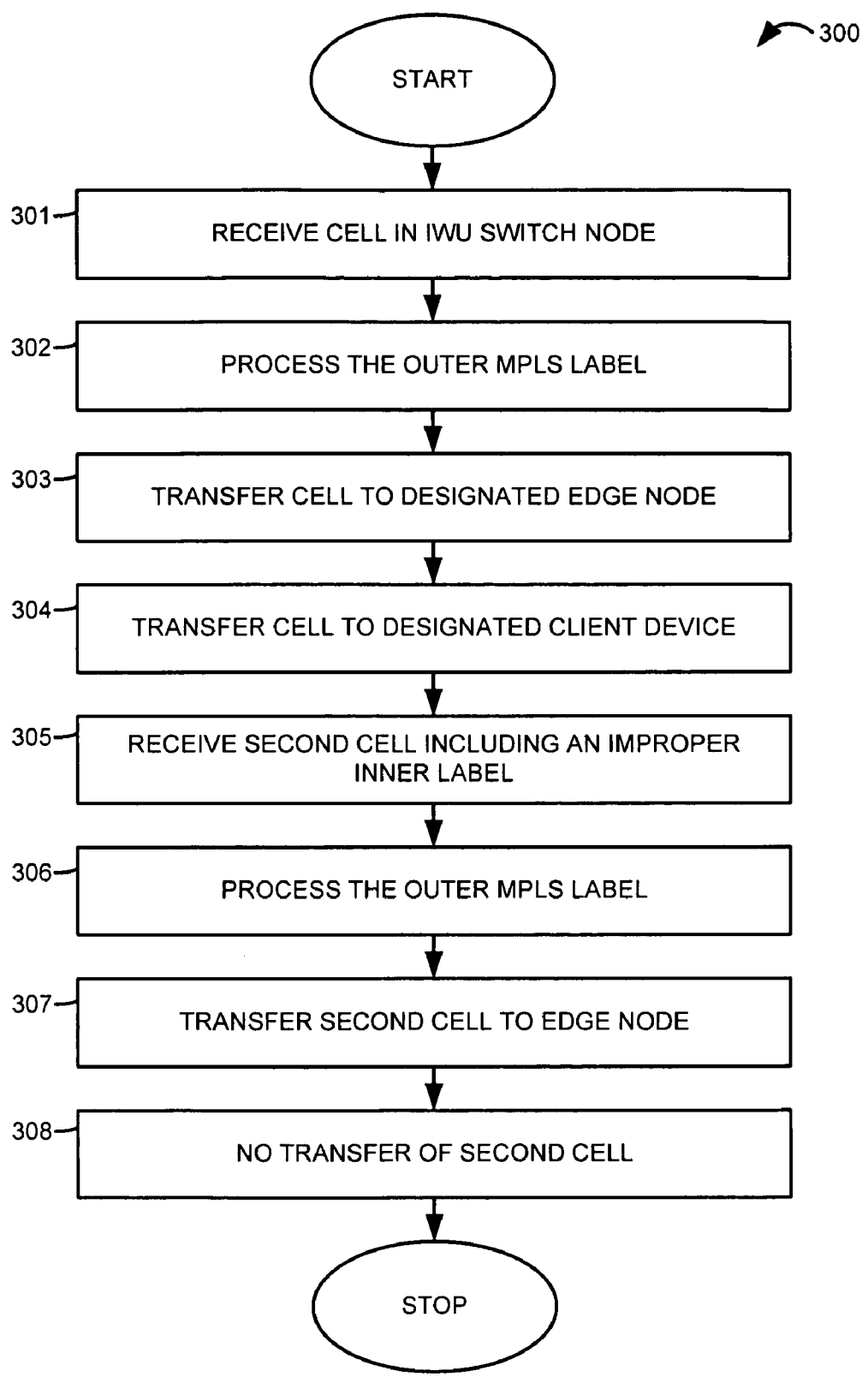
FIG. 3 is a flowchart of a method of operating the IWU for interfacing a plurality of client devices to the MPLS network according to an embodiment of the invention.
Figure 4:
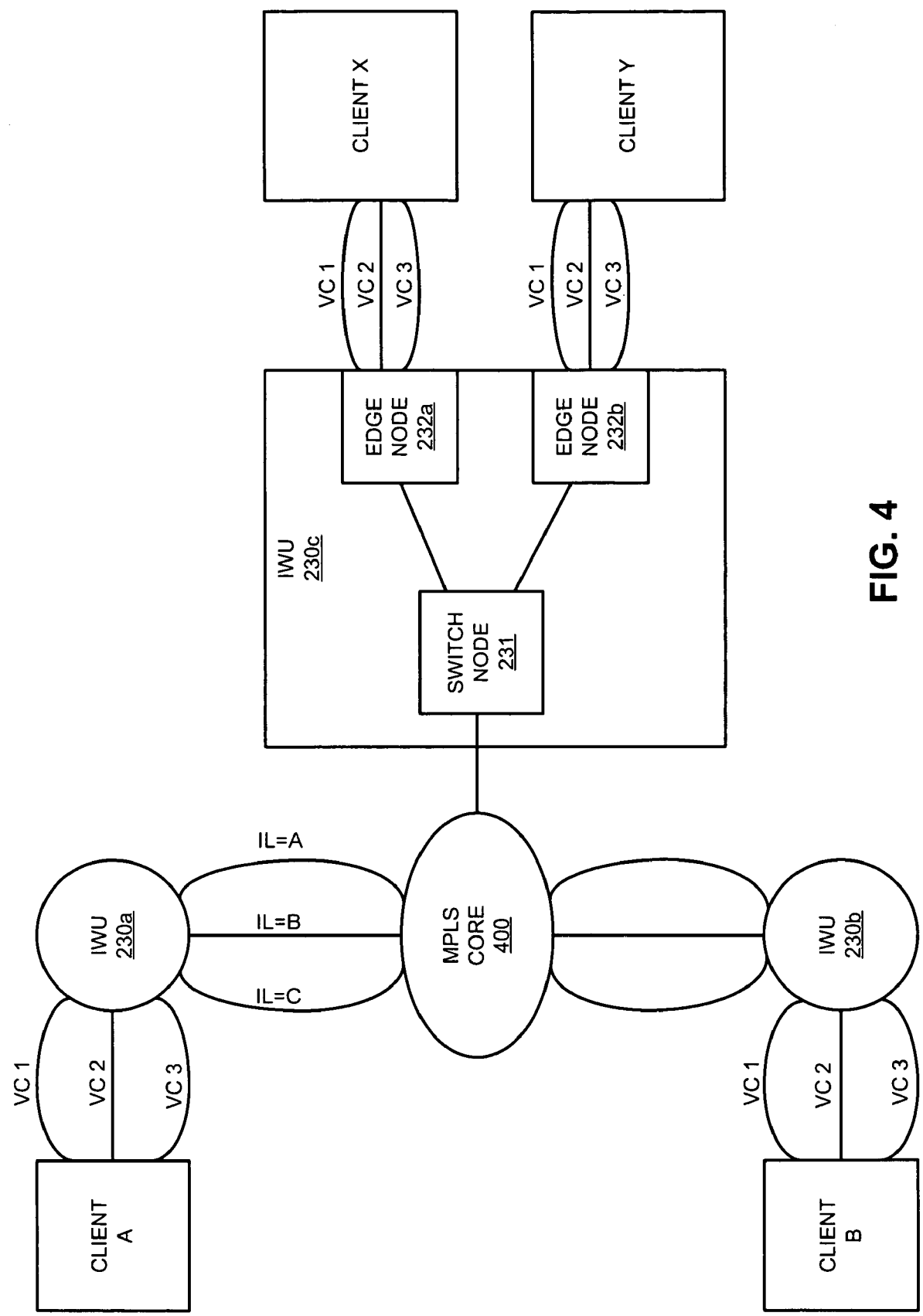
FIG. 4 is a diagram of a network environment according to an embodiment of the invention.

FIGS. 2-4 and the following descriptions depict specific embodiments to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will also appreciate that the features described below can be combined in various ways to form multiple variations of the invention. As a result, the invention is not limited to the specific embodiments described below, but only by the claims and their equivalents.

FIG. 2 is a diagram of an InterWorking Unit (IWU) 230 for interfacing a plurality of client devices to a MultiProtocol Label Switching (MPLS) network 100 according to an embodiment of the invention. A source network 101 can be in communication with the MPLS network 100 and can communicate with client devices through the MPLS network 100. In one embodiment, the plurality of client devices, such as the client devices X and Y shown in the figure, can comprise a destination network 102. The MPLS network 100 can include multiple edge nodes 110 and multiple switch nodes 112, although only one of each such node is shown for the purpose of clarity. Each edge node 110 and switch node 112 can communicate with one or more other edge nodes 110 and switch nodes 112 of the MPLS network 100.

The IWU 230 receives MPLS frames of a data stream from switch nodes 112 of the MPLS network 100 and transfers the MPLS frames to a destination client device based on both an inner label and an outer MPLS label. However, according to the MPLS standard in the Internet Engineering Task Force (IETF) RFC 3032, an edge node of the MPLS network 100 cannot inspect and/or interpret the inner label in the context of the outer MPLS label of the MPLS frame in order to deliver the MPLS frame to the destination client device.

The IWU 230 performs protocol translations between the MPLS network 100 and the destination network 102. For example, the destination network 102 can comprise an ATM network in one embodiment. The IWU 230 translates MPLS frames back into ATM cells for delivery to the destination network 102.

The IWU 230 can comprise an IWU switch node 231 and a plurality of IWU edge nodes, such as IWU edge node A 232a and IWU edge node B 232b shown in the figure. It should be understood that more than two IWU edge nodes can be included in the IWU 230, but only two are shown for the purpose of clarity. It should be further understood that the IWU switch node 231 and the IWU edge nodes can comprise multiple logical partitions of the IWU 230, and do not necessarily need to be multiple physical devices. Therefore, each client device can communicate with a unique, corresponding IWU edge node. Where the destination network 102 comprises an ATM network, the communication can occur over a Virtual Circuit (VC). It should be understood that any number of IWU edge nodes can be included in the IWU 230, depending on the number of connections or virtual circuits (VCs) to client devices outside the MPLS network 100 (see FIG. 4).

Typically, a data cell or data packet from the source network 101 will enter the MPLS network 100 at a first (ingress) edge node 110. The ingress edge node 110 determines a routing through the MPLS network 100 based on the pre-existing (i.e., inner) label. The routing is also based on the destination client device or devices that the source is allowed to communicate with. The ingress edge node 110 subsequently adds an outer MPLS label to each MPLS frame that will cause the MPLS frame to be transferred to an appropriate IWU edge node. The outer MPLS label is unique to each IWU edge node 232 and corresponding destination client device.

Here, for MPLS frame 105a, the inner label is (X) and therefore the destination is client device X, while for MPLS frame 106a the inner label is (Y) and therefore the destination is client device Y. However, in this example, source B is trying to improperly send MPLS frame 107a to client device X, even though source B is not allowed to transfer MPLS frames to client device X.

In operation, all incoming and outgoing MPLS frames pass through the IWU switch node 231. The IWU switch node 231 transfers incoming MPLS frames to an appropriate IWU edge node based on the outer MPLS label. The IWU switch node 231 can optionally strip off, remove, or deactivate the outer MPLS label (or labels). Because the switch node 112 sees two more devices (even if the IWU switch node 231 and the IWU edge nodes 232 comprise logical devices), the switch node 112 immediately previous to the IWU 230 does not strip off the outer MPLS label. This is in contrast to the prior art IWU 120, where the prior art IWU 120 receives only the inner label and therefore cannot determine if the MPLS frame should be delivered to its destination. The stripping off of the outer MPLS label inside the IWU 230 allows the IWU 230 to essentially interpret the inner label based on the outer MPLS label. Therefore, if a source unintentionally (e.g., due to mis-provisioning), or maliciously tries to use an inner label that the source is not authorized to use, the receiving IWU edge node according to the invention will not deliver the illegitimate MPLS frame (see discussion below).

In the example shown, at the IWU switch node 231, incoming MPLS frame 105b includes an outer MPLS label (A) while MPLS frames 106c and 107c both include outer MPLS labels of (B). The IWU switch node 231 transfers each MPLS frame to an applicable IWU edge node based on this added outer MPLS label. In addition, the IWU switch node 231 can strip off, remove, or deactivate the outer MPLS label. As a result, MPLS frame 105c is transferred to IWU edge node A 232a, while MPLS frames 106c and 107c are transferred to IWU edge node B 232b. It should be noted that at this point, the original address information, i.e., the inner label, is available for routing the MPLS frame out of the MPLS network 100 and to their destinations in the destination network 102. The IWU edge node A 232a will accept the MPLS frame 105c, because the MPLS frame 105c includes address information (X). The MPLS frame 105d is subsequently transferred to the client device X by the IWU edge node A 232a. Likewise, MPLS frame 106d is transferred by the IWU edge node B 232b to the client device Y. However, MPLS frame 107c, including address information (X), is received in the IWU edge node B 232b based on the outer MPLS label (B). As a result, the IWU edge node B 232b cannot properly transfer MPLS frame 107c to destination client device X, and can ignore or discard MPLS frame 107c. Consequently, Source (B) cannot improperly transfer MPLS frames over the MPLS network 100 using an unauthenticated source address, as in the prior art.

In one embodiment, the receiving IWU edge node could be configured to route an illegitimate MPLS frame or data stream to a specific error edge node. The error edge node could comprise a component of the IWU 230 or could comprise an edge node 110 of the MPLS network 100. This error edge node could be configured to receive all improper MPLS frames and would therefore know that this inner label was improper and could take appropriate action. For example, in one embodiment the error edge node could discard the illegitimate MPLS frame or data stream. In another embodiment, the error edge node could generate an alarm of some manner.

FIG. 3 is a flowchart of a method of operating the IWU 230 for interfacing a plurality of client devices to the MPLS network 100 according to an embodiment of the invention. Steps 301-304 below describe a typical operation of the IWU 230 for a proper MPLS frame. In step 301, the IWU 230 (and the IWU switch node 231) receives a MPLS frame from the MPLS network 100 in the IWU switch node 231. The MPLS frame includes an inner label and an outer MPLS label. The outer MPLS label is typically generated by an ingress edge node of the MPLS network 100.

In step 302, the IWU switch node 231 processes the outer MPLS label in order to determine one designated IWU edge node of the plurality of IWU edge nodes. The one designated IWU edge node is designated by the outer MPLS label.

In step 303, the IWU switch node 231 transfers the MPLS frame to the one designated IWU edge node. The outer MPLS label specifies a unique IWU edge node of the plurality of IWU edge nodes. The IWU switch node 231 in one embodiment can optionally strip off the outer MPLS label at this point. Alternatively, in other embodiments the IWU switch node 231 can remove (i.e., zero out) or deactivate the outer MPLS label in some manner.

In step 304, the one designated IWU edge node transfers the data transported in the MPLS frame to a designated client device that is designated by the inner label of the MPLS frame. As a result, the method enables the IWU 230 to essentially interpret the inner label based on the outer MPLS label.

Steps 305-308 below describe a typical operation of the IWU 230 for an improper MPLS frame. In step 305, the IWU 230 receives a second MPLS frame from the MPLS network 100. The second MPLS frame in this example includes an improper inner label and a proper outer MPLS label.

In step 306, the IWU switch node 231 processes the outer MPLS label of the second MPLS frame in order to determine a second designated IWU edge node. The second designated IWU edge node is designated by the outer MPLS label, as previously discussed.

In step 307, the IWU switch node 231 transfers the second MPLS frame to the second designated IWU edge node. The second designated IWU edge node is designated by the proper outer MPLS label of the second MPLS frame.

In step 308, the second designated IWU edge node does not transfer the data transported in the second MPLS frame to a designated client device. This is because the client device is improperly designated by the improper inner label of the second MPLS frame.

FIG. 4 is a diagram of a network environment 400 according to an embodiment of the invention. In the network environment shown, the clients A and B can transfer MPLS frames and data streams to clients X and Y over multiple Virtual Circuits (VCs), and vice versa. Each client can communicate with an IWU 230 over one or more ATM VCs, and each client can communicate through a dedicated edge node of an IWU 230 according to the invention. The MPLS frames can be transferred through a MPLS core 400 comprising multiple switch nodes 112 and optionally other edge nodes 110, as previously discussed. It should be understood that each IWU 230 can include multiple IWU edge nodes 232, and therefore each IWU 230 can include one or more communication paths to the MPLS core 400.

In one embodiment, the client devices communicate with the MPLS core 400 over one or more ATM networks. For example, the clients A and B could reside on a first ATM network and the clients X and Y could reside on a second ATM network. Alternatively, all clients A, B, X, and Y could reside on a common ATM network.

The invention differs from the prior art in that the IWU and method according to the invention receives both the inner label and the outer MPLS label of a MPLS frame. The IWU and method further differ from the prior art in that only one IWU edge node receives a particular MPLS frame. This is unlike the prior art IWU, where all edge nodes receive a MPLS frame and the MPLS frame is therefore always transferred out of the MPLS network.

The IWU and method according to the invention can be implemented according to any of the embodiments in order to obtain several advantages, if desired. The IWU and method according to the invention can provide a high data transmission rate. The IWU and method according to the invention can provide a secure data transmission. The IWU and method according to the invention can interface a plurality of client devices to a MPLS network while authenticating a MPLS frame source. The IWU and method according to the invention can provide a data transmission while eliminating the ability for the MPLS network to be spoofed or for a data transmission to be improperly delivered.

What is claimed is:

1. An InterWorking Unit (IWU) for interfacing a plurality of client devices to a MultiProtocol Label Switching (MPLS) network, the IWU comprising:
    a plurality of IWU edge nodes adapted for exchanging MPLS frames with the plurality of client devices;
    an IWU switch node communicating with the plurality of IWU edge nodes and adapted for exchanging the MPLS frames with the MPLS network, with the IWU switch node being configured to receive a MPLS frame from the MPLS network, with the MPLS frame including an inner label and an outer MPLS label, process the outer MPLS label in order to determine one designated IWU edge node of the plurality of IWU edge nodes, with the one designated IWU edge node being designated by the outer MPLS label, and transfer the MPLS frame to only the one designated IWU edge node;
    the one designated IWU edge node being configured to transfer the data transported in the MPLS frame to a designated client device that is designated by the inner label of the MPLS frame;
    the IWU switch node further configured to receive a second MPLS frame from the MPLS network, with the second MPLS frame including an improper inner label and a proper outer MPLS label, and transfer the second MPLS frame to a second designated IWU edge node that is designated by the proper outer MPLS label; and
    the second designated IWU edge node configured to not transfer the data transported in the second MPLS frame to a designated client device that is improperly designated by the improper inner label of the second MPLS frame.

2. The IWU of claim 1, wherein the outer MPLS label specifies a unique IWU edge node of the plurality of IWU edge nodes.

3. The IWU of claim 1, with the IWU interpreting the inner label based on the outer MPLS label.

4. The IWU of claim 1, with the IWU switch node being further configured to strip off the outer MPLS label from the MPLS frame before the IWU switch node transfers the MPLS frame to the designated IWU edge node.

5. The IWU of claim 1, wherein the second designated IWU edge node discards the data transported in the second MPLS frame.

6. The IWU of claim 1, wherein the second designated IWU edge node generates an alarm condition.

7. A method of operating an InterWorking Unit (IWU) for interfacing a plurality of client devices to a MultiProtocol Label Switching (MPLS) network, the method comprising:
    an IWU switch node of the IWU receiving a MPLS frame from the MPLS network, with the MPLS frame including an inner label and an outer MPLS label;
    the IWU switch node processing the outer MPLS label in order to determine one designated IWU edge node of a plurality of IWU edge nodes, with the one designated IWU edge node being designated by the outer MPLS label;

the IWU switch node transferring the MPLS frame to only the one designated IWU edge node;

the one designated IWU edge node transferring the data transported in the MPLS frame to a designated client device that is designated by the inner label of the MPLS frame;

the IWU switch node receiving a second MPLS frame from the MPLS network, with the second MPLS frame including an improper inner label and a proper outer MPLS label;

the IWU switch node transferring the second MPLS frame to a second designated IWU edge node that is designated by the proper outer MPLS label; and the second designated IWU edge node not transferring the data transported in the second MPLS frame to a designated client device that is improperly designated by the improper inner label of the second MPLS frame.

8. The method of claim 7, wherein the outer MPLS label specifies a unique IWU edge node of the plurality of IWU edge nodes.

9. The method of claim 7, with the IWU interpreting the inner label based on the outer MPLS label.

10. The method of claim 7, with the IWU switch node being further configured to strip off the outer MPLS label from the MPLS frame before the IWU switch node transfers the data transported in the MPLS frame to the designated IWU edge node.

11. The method of claim 7, wherein the second designated IWU edge node discards the second MPLS frame.

12. The method of claim 7, wherein the second designated IWU edge node generates an alarm condition.

13. A computer readable medium encoded with computer executable instructions for an InterWorking Unit (IWU) for interfacing a plurality of client devices to a MultiProtocol Label Switching (MPLS) network, with the IWU comprising an IWU switch node adapted for exchanging MPLS frames with the MPLS network and a plurality of IWU edge nodes in communication with the IWU switch node and adapted for exchanging the MPLS frames with the plurality of client devices, wherein:

the computer executable instructions direct the IWU switch node to receive a MPLS frame from the MPLS network, with the MPLS frame including an inner label and an outer MPLS label, direct the IWU switch node to process the outer MPLS label in order to determine one designated IWU edge node of the plurality of IWU edge nodes, with the one designated IWU edge node being designated by the outer MPLS label, direct the IWU switch node to transfer the MPLS frame to only the one designated IWU edge node, and direct the one designated IWU edge node to transfer the data transported in the MPLS frame to a designated client device that is designated by the inner label of the MPLS frame; and the computer executable instructions further direct the IWU switch node to receive a second MPLS frame from the MPLS network, with the second MPLS frame including an improper inner label and a proper outer MPLS label, transfer the second MPLS frame to a second designated IWU edge node that is designated by the proper outer MPLS label, and direct the second designated IWU edge node to not transfer the data transported in the second MPLS frame to a designated client device that is improperly designated by the improper inner label of the second MPLS frame.

14. The computer readable medium of claim 13, wherein the outer MPLS label specifies a unique IWU edge node of the plurality of IWU edge nodes.

15. The computer readable medium of claim 13, with the IWU interpreting the inner label based on the outer MPLS label.

16. The computer readable medium of claim 13, wherein the computer executable instructions direct the IWU switch node to strip off the outer MPLS label from the MPLS frame before the IWU switch node transfers the MPLS frame to the designated IWU edge node.

17. The computer readable medium of claim 13, wherein the computer executable instructions direct the second designated IWU edge node to discard the second MPLS frame.

18. The computer readable medium of claim 13, wherein the computer executable instructions direct the second designated IWU edge node to generate an alarm condition.

\* \* \* \* \*